(12) United States Patent
Burdgick et al.

(10) Patent No.: US 7,104,761 B2
(45) Date of Patent: Sep. 12, 2006

(54) HYBRID TURBINE BLADE AND RELATED METHOD

(75) Inventors: Steven Sebastian Burdgick, Schenectady, NY (US); Guy W. DeLeonardo, Glenville, NY (US); Wendy W. Lin, Niskayuna, NY (US); Christophe Lanaud, Delanson, NY (US)

(73) Assignee: General Electric Company, Schenectady, NY (US)

( * ) Notice: Subject to any disclaimer, the term of this patent is extended or adjusted under 35 U.S.C. 154(b) by 121 days.

(21) Appl. No.: 10/900,222

(22) Filed: Jul. 28, 2004

(65) Prior Publication Data

US 2006/0024169 A1    Feb. 2, 2006

(51) Int. Cl.
*F01D 5/28* (2006.01)

(52) U.S. Cl. .............. 416/229 A; 416/241 A; 29/889.71

(58) Field of Classification Search ........... 416/229 A, 416/223 R, 223 A, 229 R, 236 R, 230, 500, 416/241 A; 29/888.024, 889.2, 889.7, 889.71; 415/200

See application file for complete search history.

(56) References Cited

U.S. PATENT DOCUMENTS

| 5,295,789 | A | * | 3/1994 | Daguet | ............ 416/241 A |
| 5,720,597 | A | | 2/1998 | Wang et al. | |
| 5,839,882 | A | * | 11/1998 | Finn et al. | ............ 416/229 A |
| 5,931,641 | A | | 8/1999 | Finn et al. | |
| 6,042,338 | A | | 3/2000 | Brafford et al. | |
| 6,139,278 | A | | 10/2000 | Mowbray et al. | |
| 6,282,786 | B1 | * | 9/2001 | Evans et al. | ............ 29/889.72 |
| 6,854,959 | B1 | * | 2/2005 | Barb | ............ 416/1 |
| 6,884,507 | B1 | * | 4/2005 | Lin et al. | ............ 428/402.21 |

* cited by examiner

*Primary Examiner*—Igor Kershteyn
(74) *Attorney, Agent, or Firm*—Nixon & Vanderhye P.C.

(57) ABSTRACT

A method of manufacturing a blade for assembly on a steam turbine rotor wheel includes forming an airfoil portion with plural pockets and filling the pockets with more than one filler material chosen as a function of required temperature capability.

16 Claims, 3 Drawing Sheets

HYBRID TURBINE BLADE AND RELATED METHOD

BACKGROUND OF THE INVENTION

This invention relates generally to steam turbine buckets (or blades) and, more particularly, to composite blades designed to provide different predetermined temperature capabilities in different selected areas of the airfoil portions of the blades.

For turbine buckets or blades, centrifugal loads are a function of the operating speed, the mass of the blade, and the radius from engine centerline where that mass is located. As the mass of the blade increases, the physical area or cross-sectional area must increase at lower radial heights to be able to carry the mass above it without exceeding the allowable stresses for the given material. This increasing section area of the blade at lower spans contributes to excessive flow blockage at the root and thus lower performance. The weight of the blade contributes to higher disk stresses and thus to potentially reduced reliability.

Several prior U.S. patents relate to so-called "hybrid" blade designs where the weight of the airfoil is reduced by composing the airfoil as a combination of a metal and polymer filler material. Specifically, one or more pockets are formed in the airfoil portion and filled with the polymer filler material in such a way that the airfoil profile is not altered. These prior patents include U.S. Pat. Nos. 6,139,278; 6,042,338; 5,931,641 and 5,720,597. See also co-pending and commonly owned application Ser. No. 10/249,518 filed Apr. 16, 2003. The '518 application discloses hybrid blades where pocket configurations are altered to vary the damping characteristics of respective groups of blades.

Another issue relating to the use of hybrid steam turbine blades, however, relates to cost as a function of temperatures experienced by such blades during use. In a double flow steam turbine, for example, there is significant windage heating of the last stage blade tip area during partial load and full speed conditions. The hood area behind the blades has a water spray system to cool the exhaust flow to the condenser. Even during the operation of the water sprays, however, the cooling flow does not migrate to the heated area near the blade tips, and thus, cooling of the blade tips is minimal. The blade tips during this condition can reach in excess of 400° F. wherein, during normal operation, the blade temperatures reach only about 150° F. Accordingly, most of the current polymers (urethanes and/or rubbers) considered for hybrid bucket applications are restricted for use at less than 300° F. While there are a few high temperature polymers available, their cost may be as much as 5× the cost of the lower temperature polymers.

BRIEF DESCRIPTION OF THE INVENTION

This invention expands the hybrid blade concept to include the use of multiple fillers in a single blade or bucket as a function of required temperature capability. Typically, the higher temperature material would be used in the outermost radial pockets. Thus, the more costly and higher temperature capability material may be selected for use only in a limited area of the airfoil tip while the less expensive material may be selected in other areas, e.g., the radially inner or lower section of the blade airfoil. The cost benefit to this arrangement is further enhanced by the fact that a lesser volume of filler is required in the radially outer portions of the blade.

In its broader aspects, therefore, the invention relates to a method of manufacturing a blade for assembly on a steam turbine rotor wheel comprising forming an airfoil portion with plural pockets and filling said pockets with more than one filler material chosen as a function of required temperature capability.

In another aspect, the invention relates to a turbine blade having an airfoil portion formed with plural pockets filled with respectively different polymer filler materials chosen as a function of required temperature capability.

In another aspect, the invention relates to a steam turbine rotor wheel comprising a row of blades secured about a circumferential periphery of the wheel, each blade having plural pockets filled with respectively different polymer fill materials chosen as a function of required temperature capability.

The invention will now be described in detail in connection with the drawings identified below.

DETAILED DESCRIPTION OF THE INVENTION

Figure 1:
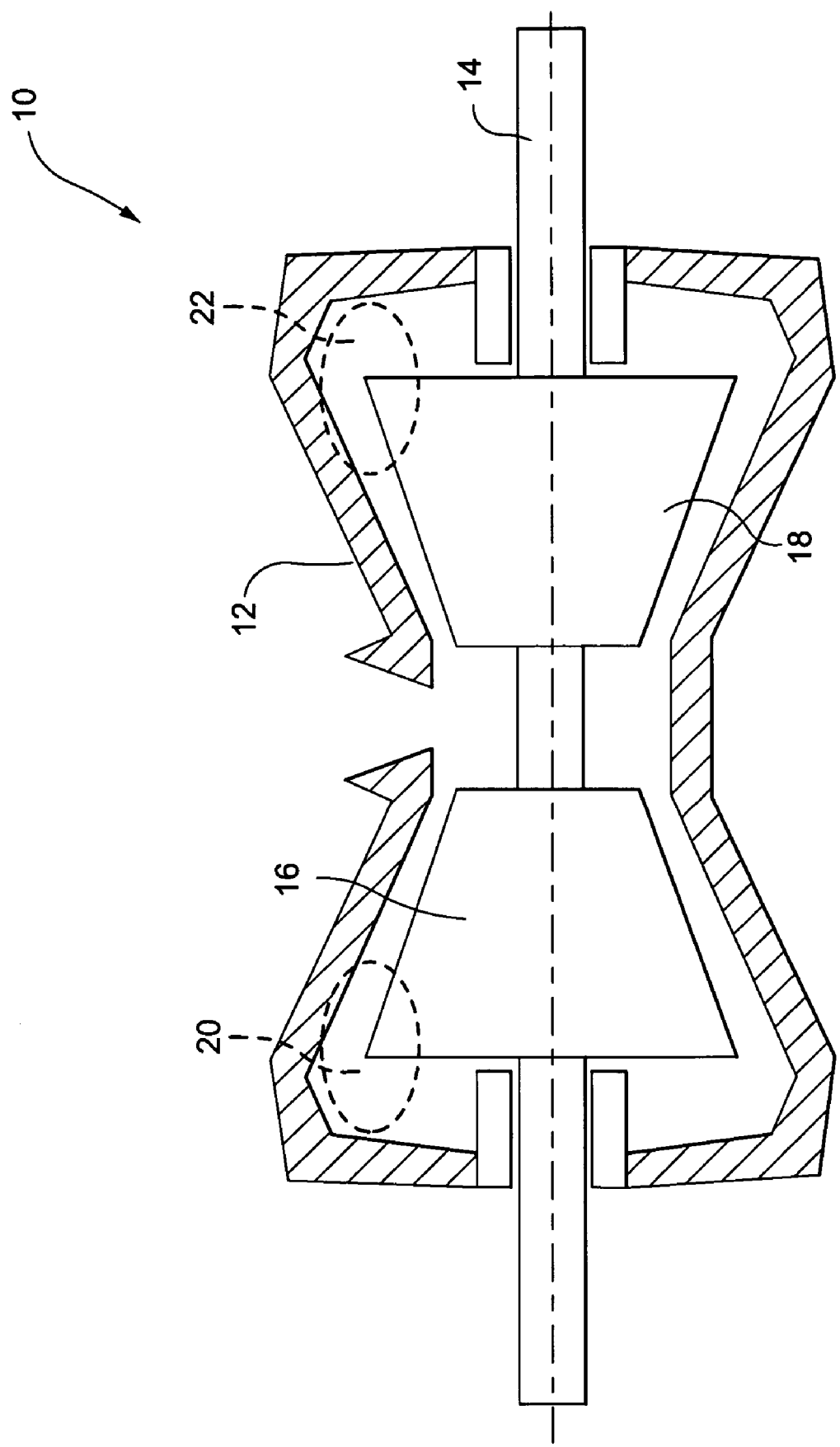
FIG. 1 is a schematic diagram of a double-flow low pressure turbine.
Figure 2:
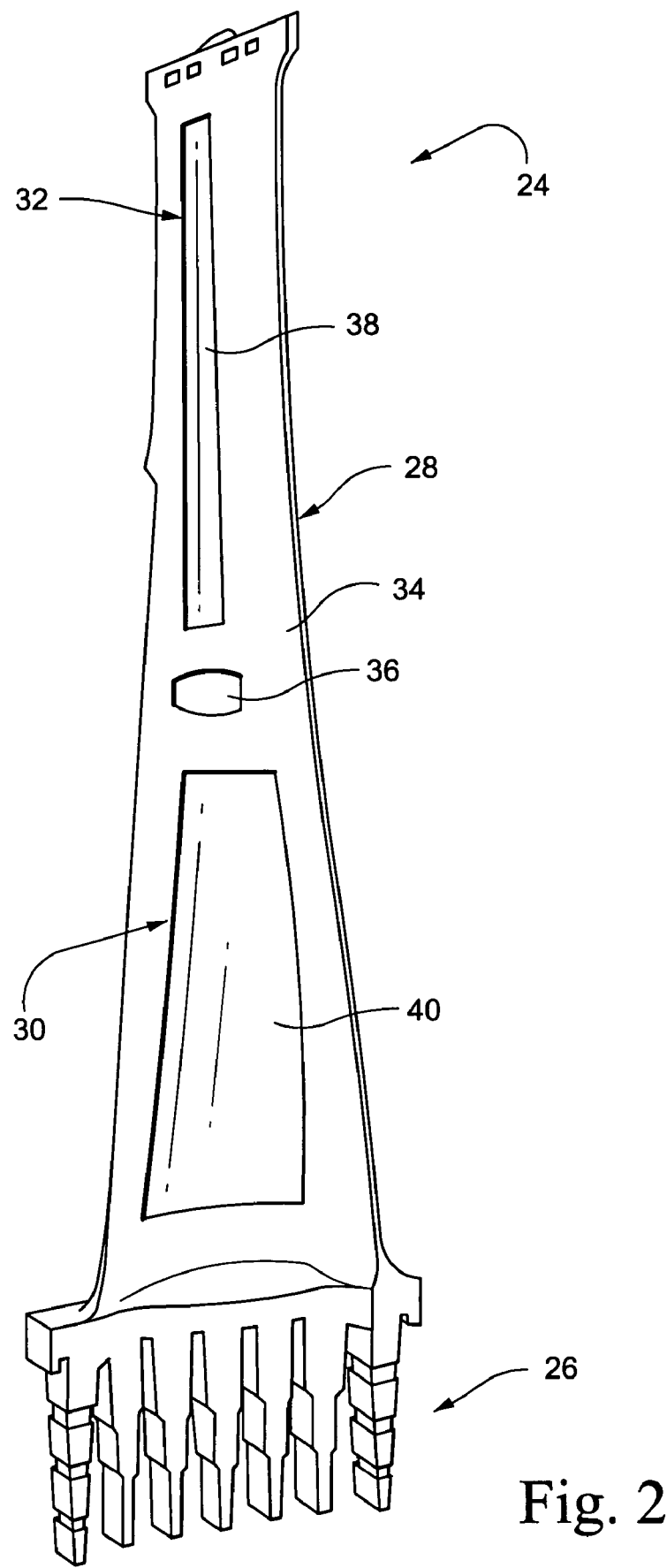
FIG. 2 is a perspective view of a partially completed hybrid blade in accordance with an exemplary embodiment of the invention.

FIG. 1 shows a schematic diagram of a double-flow, low pressure turbine 10 including a turbine casing 12, rotor 14 and a plurality of wheels in two turbine sections indicated at 16, 18. The areas 20, 22 circled in dotted lines represent the radially outermost regions of the last stage blades that have been shown to experience the most windage heating during partial load conditions. Thus, in accordance with an exemplary embodiment of the invention, higher temperature filler material (at least 400° F. capability) is used in radially outer pockets of the blades. FIG. 2, for example, shows a blade 24 including a shank portion 26 and an airfoil portion 28. Radially inner and outer pockets 30, 32 are formed on the pressure side of the airfoil portion 28, separated by a relatively wide web or rib 34 and a mid-span damper 36. In the example given, a high temperature filler material 38 is used to fill pocket 32 and a lower temperature filler material 40 would be used to fill pocket 30. Some stages may require high temperature filler material only in the outer 10–15% of the airfoil portion, but in any event, the determination can be made based on test data for particular turbine designs. It may be that more than two polymer materials be used in as many pockets, successively from highest temperature material to lowest.

Figure 3:
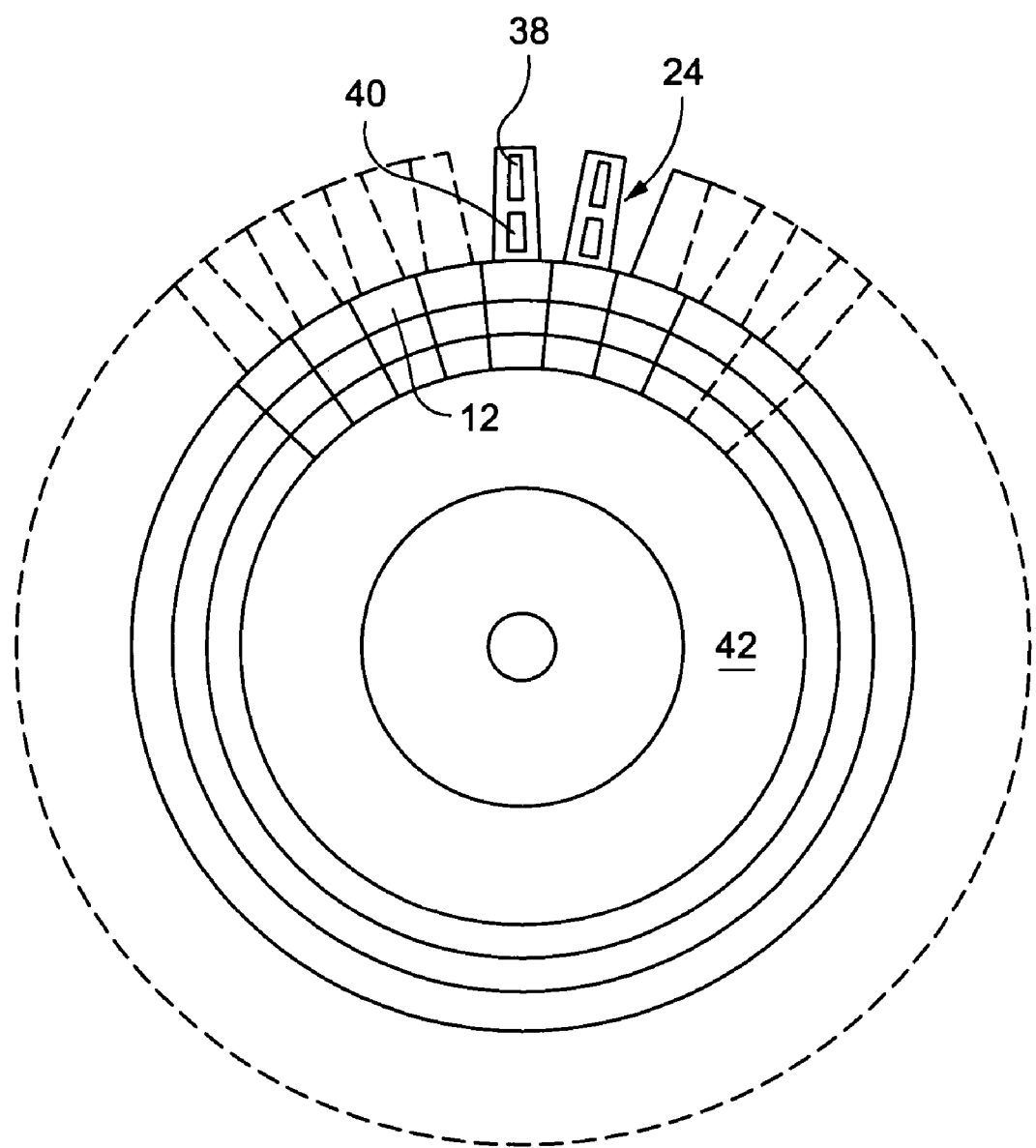
FIG. 3 is a schematic side elevation of a turbine wheel having a plurality of turbine blades mounted thereon.

FIG. 3 illustrates schematically a row of blades 24, mounted on a turbine rotor wheel 42, the blades 24 utilizing plural filler materials 38, 40 as described herein.

The filler materials 38, 40 may comprise known urethanes, rubber compounds or polymer mixtures with other materials such as glass or ceramics with different temperature capabilities. Choices for bonding the filler materials to the metal surface of the airfoil portion 28 include, without limitation, self adhesion, adhesion between the filler materials 38, 40 and the metal surface of the airfoil portion 28, adhesive bonding (adhesive film or paste), and fusion bonding.

The utilization of different filler materials permits improved temperature capability of hybrid buckets at reduced cost. Each material used will be formulated for specific locations on the bucket based on temperature characteristics of the filler materials and temperature capability requirements of the blades in any given stage. Using the more expensive, high temperature, materials in a limited location on the bucket will make the design of hybrid blades more feasible especially for those blades that experience high windage conditions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of manufacturing a blade for assembly on a steam turbine rotor wheel comprising forming an airfoil portion with plural pockets and filling said pockets with more than one filler material chosen as a function of required temperature capability wherein said plural pockets include a radially outer pocket and a radially inner pocket, and wherein the temperature capability of the filler material in the radially outer pocket is greater than the filler material in the radially inner pocket.

2. The method of claim 1 wherein said greater temperature capability comprises at least a 400° F. capability.

3. The method of claim 1 wherein said filler materials comprise polymers.

4. The method of claim 1 wherein said filler materials comprise urethane polymers.

5. A turbine blade having an airfoil portion formed with plural pockets filled with respectively different polymer filler materials chosen as a function of required temperature capability, wherein said plural pockets include a radially outer pocket and a radially inner pocket, and wherein the temperature capability of the filler material in the radially outer pocket is greater than the filler material in the radially inner pocket.

6. The steam turbine rotor wheel of claim 5 wherein said polymer filler materials comprise urethane polymers.

7. A steam turbine rotor wheel comprising a row of blades secured about a circumferential periphery of the wheel, each blade having plural pockets filled with respectively different polymer filler materials chosen as a function of required temperature capability, wherein a radially outermost one of said plural pockets is filled with a filler material with a higher temperature capability than filler material in other of said plural pockets.

8. The steam turbine rotor wheel of claim 7 wherein said polymer filler materials comprise urethane polymers.

9. The steam turbine rotor wheel of claim 7 wherein said greater temperature capability comprises at least a 400° F. capability.

10. The steam turbine rotor wheel of claim 7 wherein said filler materials comprise urethane polymers.

11. A steam turbine rotor wheel comprising a row of blades secured about a circumferential periphery of the wheel, each blade having plural pockets filled with respectively different polymer filler materials chosen as a function of required temperature capability;
    wherein said multiple pockets include a radially outer pocket and a radially inner pocket, and wherein the temperature capability of the filler material in the radially outer pocket is greater than the filler material in the radially inner pocket.

12. A method of manufacturing a blade for assembly on a steam turbine rotor which comprising
    forming an airfoil portion with a plurality of pockets at locations radically displaced from each other;
    on the airfoil portion;
    choosing at least two different filler materials for said plurality of pockets based on in-use temperatures at said specified locations; and
    bonding the chosen filler materials within said plurality of pockets.

13. The method of claim 12 wherein said plurality of pockets include a radially outer pocket and the filler material chosen for said radially outer pocket has an in-use temperature capability of at least 400° F.

14. The method of claim 12 wherein said filler materials comprise polymers or urethane polymers.

15. The method of claim 14 wherein said polymers or urethane polymers are mixed with glass or ceramic materials.

16. The method of claim 12 wherein said plurality of pockets are formed in radially inner to radially outer locations on said airfoil portion and wherein the chosen filler materials increase in temperature capability in a radially outer direction.

* * * * *

UNITED STATES PATENT AND TRADEMARK OFFICE
CERTIFICATE OF CORRECTION

| | |
|---|---|
| PATENT NO. | : 7,104,761 B2 |
| APPLICATION NO. | : 10/900222 |
| DATED | : September 12, 2006 |
| INVENTOR(S) | : Burdgick et al. |

It is certified that error appears in the above-identified patent and that said Letters Patent is hereby corrected as shown below:

In the Claims:

Col. 4, Line 25 Claim 12, line 4, delete "radically" and insert --radially--.

Col. 4, Line 29 Claim 12, line 8, delete "specified".

Signed and Sealed this

Twenty-sixth Day of December, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,104,761 B2 |
| APPLICATION NO. | : 10/900222 |
| DATED | : September 12, 2006 |
| INVENTOR(S) | : Burdgick et al. |

It is certified that error appears in the above-identified patent and that said Letters Patent is hereby corrected as shown below:

In Column 1, immediately beneath the Title please insert the phrase:

--This invention was made with Government support under DE-FC26-03NT41841 awarded by the Department of Energy. The Government has certain rights in this invention.--

Signed and Sealed this

Twenty-fourth Day of June, 2008

JON W. DUDAS
*Director of the United States Patent and Trademark Office*